US007545596B2

(12) United States Patent
Ng et al.

(10) Patent No.: US 7,545,596 B2
(45) Date of Patent: Jun. 9, 2009

(54) SYSTEM AND METHOD FOR WORM MAGNETIC RECORDING

(75) Inventors: Spencer W. Ng, San Jose, CA (US); Richard Michael Hamilton New, San Jose, CA (US); Bruce Wilson, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 655 days.

(21) Appl. No.: 11/324,575

(22) Filed: Jan. 3, 2006

(65) Prior Publication Data

US 2007/0153411 A1 Jul. 5, 2007

(51) Int. Cl.
*G11B 15/04* (2006.01)

(52) U.S. Cl. .............................. 360/60; 360/66; 360/75
(58) Field of Classification Search ........................ None
See application file for complete search history.

(56) References Cited

U.S. PATENT DOCUMENTS

| | | | | |
|---|---|---|---|---|
| 5,020,040 A | | 5/1991 | Lee | 369/13 |
| 6,636,371 B1 * | | 10/2003 | Komatsu et al. | 360/16 |
| 6,879,454 B2 | | 4/2005 | Winarski et al. | 360/60 |
| 7,221,639 B2 * | | 5/2007 | Onoe et al. | 369/126 |

FOREIGN PATENT DOCUMENTS

JP 2004158083 6/2004

OTHER PUBLICATIONS

Yongge Wang and Yuliang Zheng, "Fast and Secure Magnetic WORM Storage Systems"; Department of Software and Information Systems University of North Carolina at Charlotte, Sep. 7, 2004.

* cited by examiner

*Primary Examiner*—Jason C Olson
(74) *Attorney, Agent, or Firm*—John L. Rogitz

(57) ABSTRACT

WORM safeguards are provided in a magnetic disk drive in which the disks are pre-magnetized or pre-recorded such that all magnetic domains on each recording surface are completely aligned pointing in the same direction. A special write head which can magnetically write only in the direction opposite to the pre-magnetization orientation is also provided.

15 Claims, 3 Drawing Sheets

SYSTEM AND METHOD FOR WORM MAGNETIC RECORDING

FIELD OF THE INVENTION

The present invention generally relates to write once-read many (WORM) magnetic recording systems.

BACKGROUND

Data storage media have been introduced onto which data may be written only once but read many times. Such media is referred to as Write-Once, Read Many, or WORM for short. The advantages of such media are many fold, and include the ability to enhance enforcement of copyrights.

In part because legal rights are involved with WORM media, government regulations have arisen that are related to WORM media. Non-compliance with applicable regulations may incur severe penalty under some of the rules.

In greater detail, so-called physical WORM, or "P-WORM", has been proposed in which WORM requirements are imposed by the physical characteristics of the media. Among P-WORM media are optical disks. Another potential type of WORM might be software WORM, or "S-WORM", in which WORM requirements are imposed through software interlocks.

As critically recognized herein, existing P-WORM systems which, recall, use optical media, are having trouble keeping pace with current performance and capacity requirements for storing regulated data. Magnetic disks could solve this problem by storing data on rewritable magnetic disks, which have good performance in terms of speed and capacity, but as understood herein implementing WORM safeguards in such systems, absent the present invention, would require exclusive reliance on S-WORM, which has the drawback of being a weaker WORM guarantee than P-WORM. With this critical recognition in mind, the invention herein is provided.

SUMMARY OF THE INVENTION

WORM safeguards are provided in a magnetic disk drive in which the disks are pre-magnetized or pre-recorded such that all magnetic domains on each recording surface are completely aligned pointing in the same direction. A special write head which can magnetically write only in the direction opposite to the pre-magnetization orientation is also provided.

In one aspect, a magnetic disk drive includes a disk with substantially all magnetic domains initially having the same baseline circumferential magnetization orientation as all other domains. A write head is juxtaposed with the disk, and a write channel is provided that is configured to send current to the write head in one direction only, such that the write head, when energized, can orient magnetic domains on the disk only in the orientation that is opposite to the baseline orientation.

In some implementations, to prevent appending data to a previously written sector as might be attempted by overwriting originally-oriented magnetic moments, the write channel can write a code such as a cryptographic hash or a CRC that represents data in a written sector, such that the probability of being able to alter the code correctly to match any subsequently-altered data by further unidirectional writing is small. In such a case, a system subsequently reading the disk can compare the code with a code recomputed from the data that is read, and if the codes do not match, know that the data was impermissibly altered from its initial (and only intended) write. Alternatively, processing circuitry such as the disk drive controller may be programmed to always attempt to read a sector before performing a write, and if the sector contains valid data as indicated by at least one transition, prohibiting the write.

The disk preferably is sealed in the housing.

The length of each overwritten portion of the disk may be a multiple of a write bubble length associated with the write head. Or, a run-length constrained modulation code may be used to ensure that each region of medium to be overwritten is longer than a write bubble length associated with the write head, with the run-length constrained modulation code placing no constraints on the length of medium remaining unchanged between each pair of overwritten regions, thus establishing an asymmetric modulation code constraint. Still again, in a symmetric code implementation, a run length constrained modulation code may be used to ensure that the shortest recorded magnet is longer than the write bubble length associated with the write head.

In another aspect, a magnetic recording disk includes a substrate and a magnetic recording medium on the substrate. All magnetic orientations on the medium are aligned with a common baseline circumferential orientation.

In still another aspect, a magnetic recording system includes a write head having a coil through which electric current can flow to induce magnetic flux at a gap defined by the write head, and a write channel is electrically connected to the coil. The write channel is configured to send current to the coil in only a permitted direction. The write channel at all times is not capable of sending current to the coil in a direction opposite the permitted direction.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
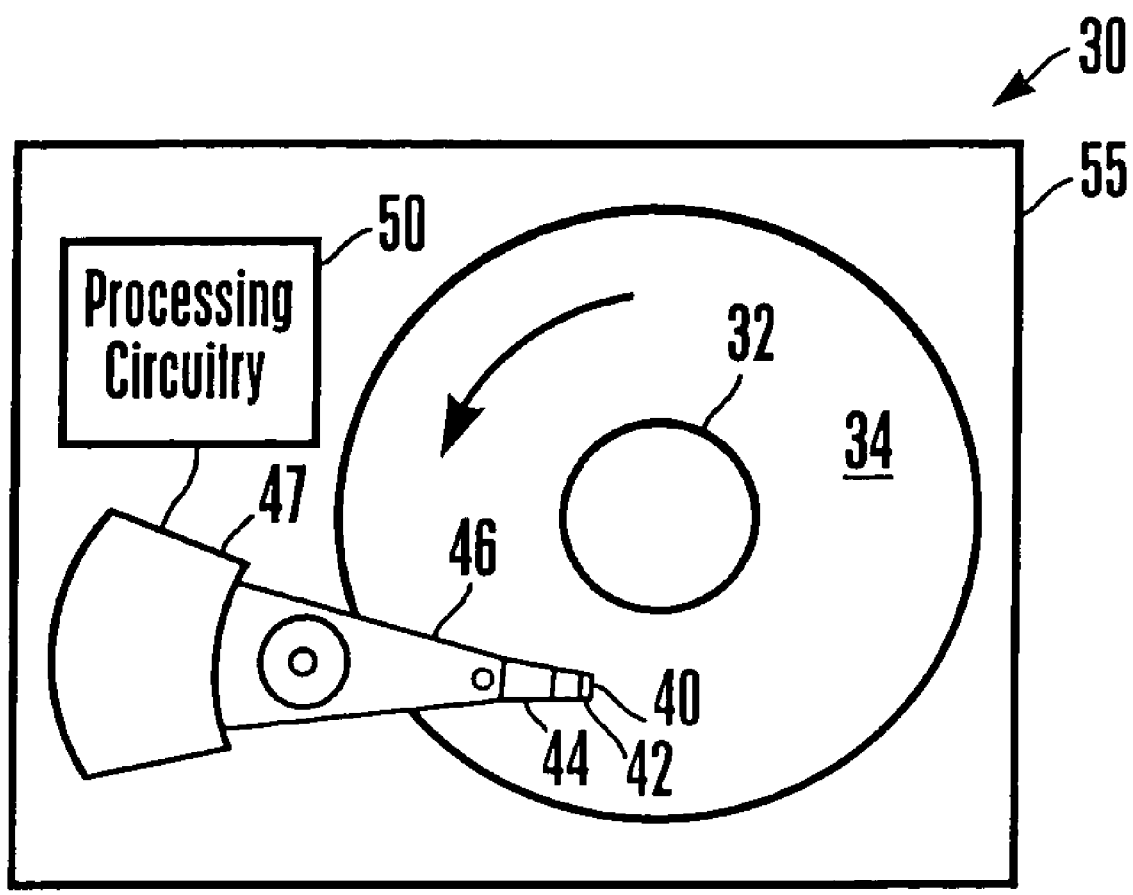
FIG. 1 is a schematic plan view of a hard disk drive, showing one non-limiting environment for the present invention.

Referring initially to FIG. 1, a magnetic disk drive 30 includes a spindle 32 that supports and rotates a magnetic disk 34. The spindle 32 is rotated by a spindle motor that is controlled by a motor controller which may be implemented in the electronics of the drive. A slider 42 has a combined read and write magnetic head 40 and is supported by a suspension 44 and actuator arm 46 that is rotatably positioned by an actuator 47. The head 40 may be a GMR or MR head or other magnetoresistive head. It is to be understood that a plurality of disks, sliders and suspensions may be employed. The suspension 44 and actuator arm 46 are moved by the actuator 47 to position the slider 42 so that the magnetic head 40 is over the surface of the magnetic disk 34. When the disk 34 is rotated by the spindle motor 36 the slider is supported on a thin cushion of air known as the air bearing that exists between the surface of the disk 34 and an air bearing surface (ABS) of the head. The magnetic head 40 may then be employed for writing information to multiple circular tracks on the surface of the disk 34, as well as for reading information therefrom. To this end, processing circuitry 50 exchanges signals, representing such information, with the head 40, provides spindle motor drive signals for rotating the magnetic disk 34, and provides control signals to the actuator for moving the slider to various tracks. The components described above may be mounted on a housing 55. Preferably, the disk(s) 34 are sealed in the housing 55.

Figure 2:
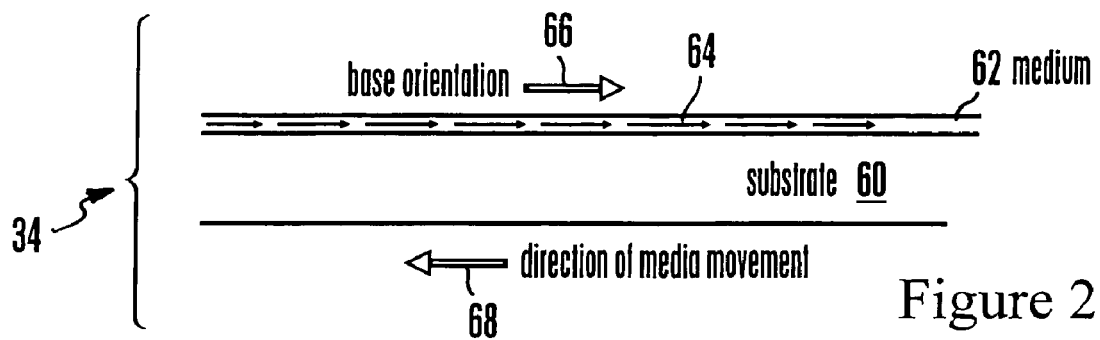
FIG. 2 is a schematic side view of the magnetic recording medium in its initial "baseline orientation" magnetic state.

Now referring to FIG. 2, details of the disk 34 may be seen. As shown, the disk 34 can include a substrate 60 and on top of the substrate 60 a thin magnetically recordable medium 62. All of the magnetic domains 64 of the medium 62 are initially aligned in the same direction as shown to establish a baseline orientation shown by the arrow 66. The direction of disk movement relative to the head 40 is shown by the arrow 68.

To achieve the configuration shown in FIG. 2, the disk 34 is pre-magnetized during manufacturing such that the entire disk surface has the same circumferential magnetization orientation. One non-limiting way to establish the uniform base magnetization is to apply a very strong magnetic field to the entire disk surface using a very strong magnet. Another non-limiting method of establishing the uniform base magnetization is to write such a magnetization using a special write head and system during the low level formatting of the disk surface.

Figure 3:
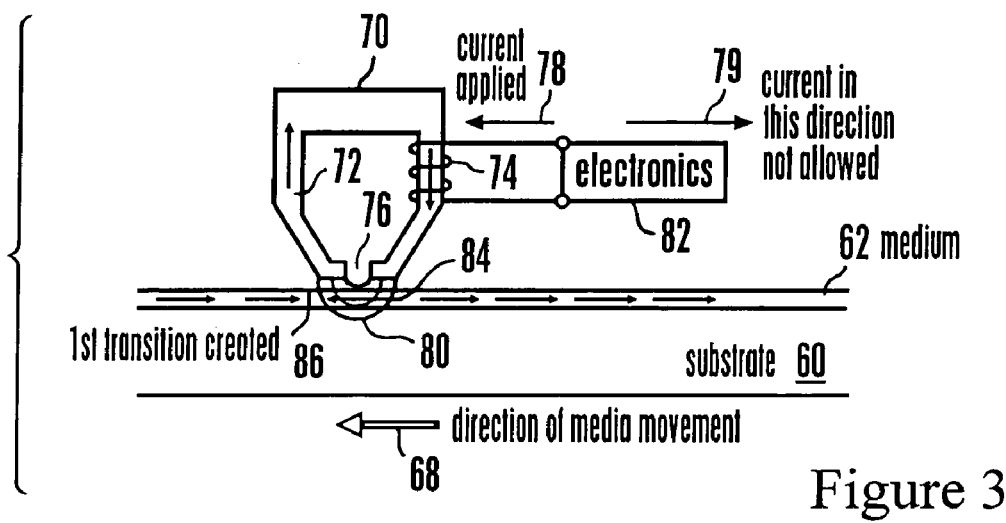
FIG. 3 is a schematic side view of the magnetic recording medium with write head, illustrating that current is allowed to pass through the write head coil in only one direction to establish a first transition.

In any case, once the disk 34 is premagnetized with the uniform base magnetization, the disk is ready for use. FIG. 3 shows that the head 40 includes a write head 70. The write head 70 may be a thin film write head or it may be a wire-wound head that includes a ring-shaped core 72 of magnetically soft material, such as ferrite, and a coil 74 of wire that is wrapped around the core 72. A gap 76 is formed in the core 72 as shown. As the write head 70 flies very closely over the magnetic recording media 62, the gap 76 is adjacent to the media 62. When an applied current 78 passes through the coil 74, it induces a magnetic field inside the core 72. At the gap 76 magnetic flux (indicated by arrows 80) leaks outside the core 72 and fringes away from the gap 76 as shown. The leaked magnetic flux 80 passes through the media 62, magnetizing the magnetically hard material of the media in accordance to its hysteresis loop characteristics and the amount of magnetic flux applied.

The present invention applies to both analog and digital recording. With particular respect to digital magnetic recording, the head 70/media 62/write driver are designed such that when current is applied to the head, the resulting magnetic flux going through the media is sufficiently strong to align the magnetic domains immediately adjacent to the head completely in the same direction as the applied magnetic flux, regardless of the previous orientation. This is referred to as saturation magnetization.

However, unlike conventional write head systems, in the present invention a write driver 82 is provided that can apply current to the coil 74 of the write head 70 in one direction only, namely, that shown by the arrow 78. The electronics 82 are configured such that application of current in the opposite direction (shown at 79) in the coil is always prevented, i.e., the write driver at all times is not capable of sending current to the coil in a direction opposite the permitted direction 78. This can be done any number of ways, e.g., by not providing, or removing, or disabling current direction switches in the channel 82.

The allowed current direction 78 is one that will induce a magnetic field in the media in the opposite magnetic orientation of the base magnetization, i.e., in the anti-baseline orientation direction as shown at arrow 84, creating a magnetic transition indicated at 86. Magnetic transitions, once created, may be detected by the read portion of the head 40, with transitions in sync fields being used to establish the clock for reading data and with transitions in data fields representing, e.g., a binary "1". The absence of a transition in a clocked period may represent a binary "0".

Figure 4:
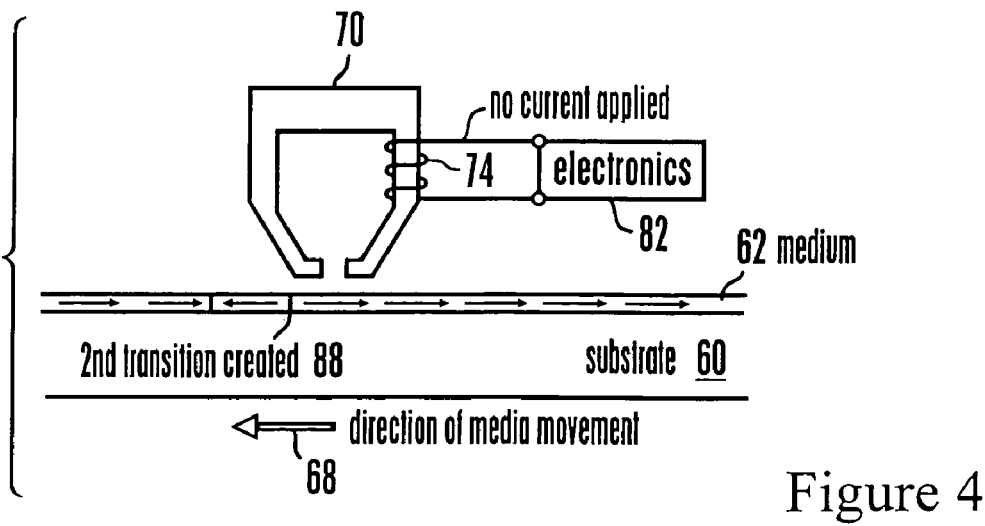
FIG. 4 is a schematic side view of the magnetic recording medium with write head, illustrating the establishment of a second transition by stopping current through the coil.

After writing the transition 86 as described, to create the next transition and now referring to FIG. 4, the electronics 82 simply switch off the current to the coil 74 of the head 70, terminating the magnetic flux. Because the core 72 of the head 70 is made from magnetically soft material, it has little remanent magnetization, meaning that little or no magnetic field fringes out from the gap 76 of the write head 70. Without any magnetization field coming from the write head 70, the portion of the media 62 that is immediately adjacent to the head 70 will retain its original baseline orientation. Thus, when the write current is switched off, a second transition indicated at 88 in FIG. 4 is established. Repeating the above energization and deenerigization of the coil 74 creates additional transitions.

As recognized herein, with the write electronics 82 being unable to write in the base-orientation direction 79, it is not possible to change a previously written anti-baseline orientation back to the baseline orientation. Thus, the disk drive can not overwrite a sector that has already been written once to any other arbitrary data pattern. However, the present invention understands that absent the features below, it may be possible for the drive to alter a previously written sector by switching a previously unswitched baseline orientation into an anti-baseline orientation. In such a case the drive may be thought of as "append" only, in that additional magnetic transitions may be appended to a previously written sector but no anti-baseline orientations may be changed back to the baseline orientation.

In the event that it is desired to further prevent such additional appends so that write-once capability is enforced, various non-limiting methods are introduced herein. As one alternative, a code representing the data in the written sector such as a cryptographic hash or a strong cyclic redundancy code (CRC) for the data of a sector can be included in the written data such that the probability of being able to alter the code correctly to match any subsequently-altered data by further unidirectional writing is infinitesimally small. A system subsequently reading the disk can compare the code with a code recomputed from the data that is read, and if the codes do not match, know that the data was impermissibly altered from its initial (and only intended) write.

As another alternative, the processing circuitry 50 (FIG. 1) can be programmed to always attempt to read a sector before performing a write, and if the sector contains valid data as indicated by at least one transition, prohibiting the write.

Figure 5:
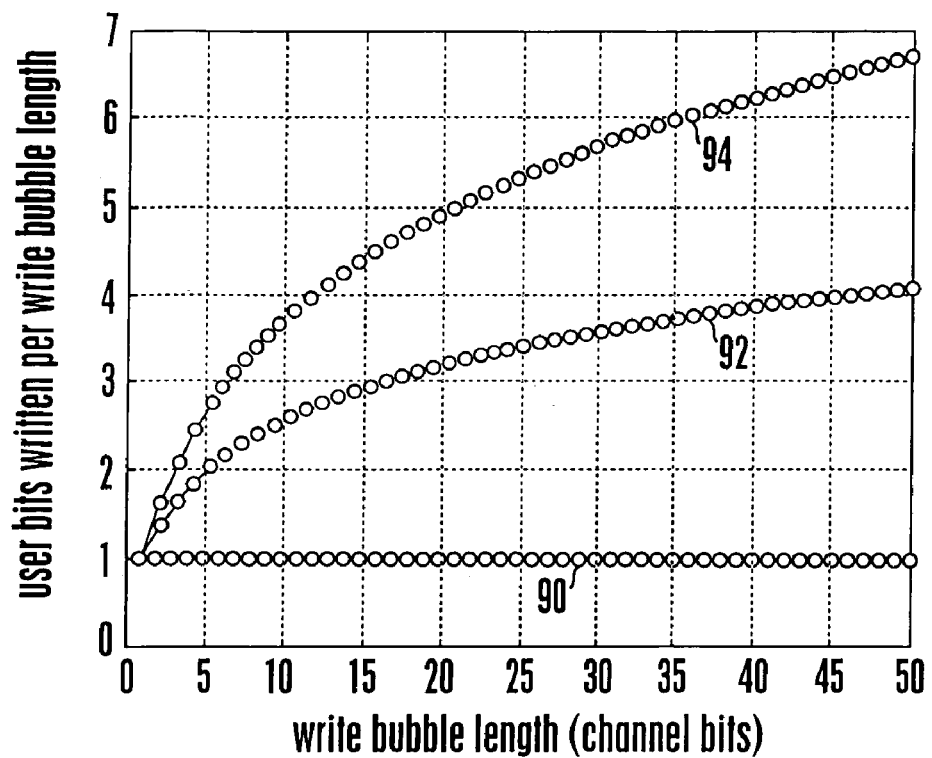
FIG. 5 is a graph showing user bits per write bubble length as a function of write bubble length for various modulation methods.
Figure 6:
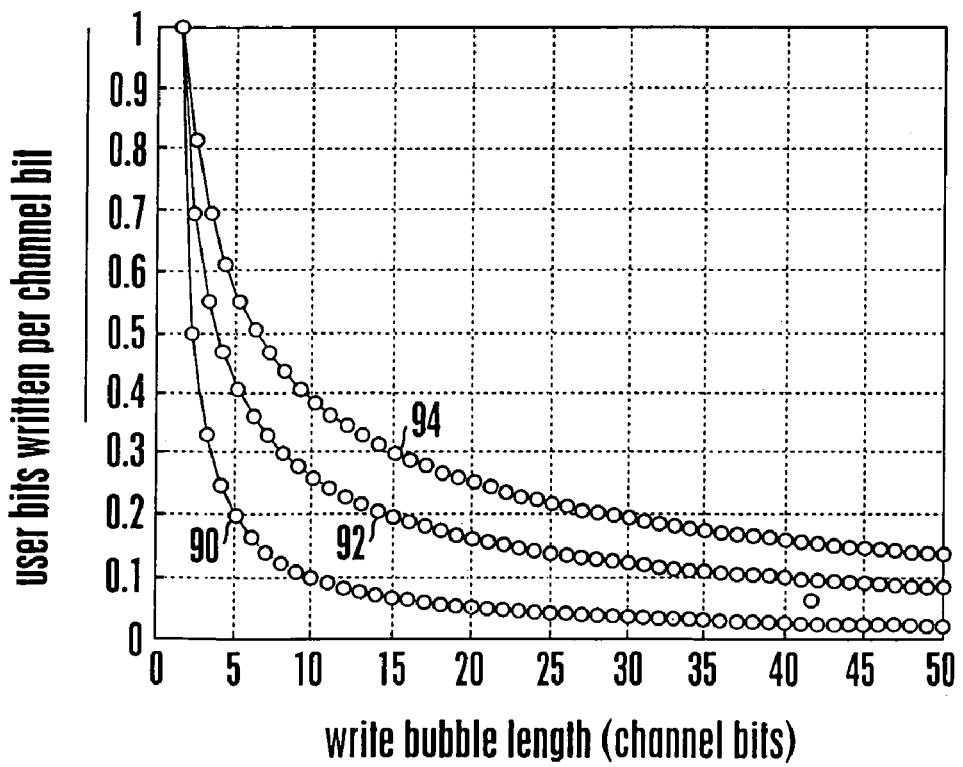
FIG. 6 is a graph showing user bits per channel bit as a function of write bubble length for various modulation methods.

As understood herein and now referring to FIGS. 5 and 6, in longitudinal recording the size of the so-called "write bubble" (the magnetization field range of the write head) is substantially larger than the bit length, whereas for perpendicular recording and for patterned media (which also will likely use perpendicular recording), the disparity between the write bubble size and the normal bit length is much smaller. With these considerations in mind, the write bubble imposes a minimum size on the length of medium which is switched during the write process. There are three ways that this restriction can be handled.

One way is to require that the length of each overwritten portion of the disk be a multiple of the write bubble length. In many cases the write bubble will be many times the length of a typical recorded data bit. This first approach would therefore greatly reduce the amount of data that could be recorded.

A second way to deal with the large size of the write bubble is to record data at the usual density but require that the length of each overwritten portion of the disk be equal to or greater than the length of the write bubble. This can be achieved with a run length constrained modulation which enforces a d constraint.

The length of the write bubble only places a limit on the minimum size of the regions which will be flipped. The regions of medium which remain in their original state can be arbitrarily small. This can be reflected by using asymmetric modulation code constraints as a third alternative, in which the minimum length of an overwritten portion of the disk can be longer than the minimum length of portions of the disk that retain their original baseline orientation. These modulation constraints are less restrictive and thus allow more data to be recorded.

FIGS. 5 and 6 show how, when the simple reduced density approach (shown at 90) is followed, the density is limited to only one user bit recorded in the length of the write bubble. In contrast, when a symmetric d-constrained modulation code (shown at 92) is used, more data per unit track length can be recorded. For example, if the write bubble is fifteen bits long, then three bits of user data can be recorded in the length of the write bubble. If an asymmetric constraint (shown at 94) is used the amount of data can be increased still further to four and one-half bits per write bubble length.

Accordingly, a disk drive can be rendered capable of creating magnetic transitions in any location in the media but only once. After data has been written to a sector, the drive is no longer able to write new data onto that sector a second time.

While the particular SYSTEM AND METHOD FOR WORM MAGNETIC RECORDING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". For instance, the invention can apply to longitudinal or horizontal magnetic recording as well as to vertical or perpendicular recording. It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A magnetic disk drive, comprising:
   at least one disk with substantially all magnetic domains initially having the same baseline circumferential magnetization orientation as all other domains;
   at least one write head juxtaposed with the disk; and
   a write driver configured to send current to the write head in one direction only, such that the write head, when energized, can orient magnetic domains on the disk only in the orientation that is opposite to the baseline orientation, wherein the write driver writes a code representing data in a written sector such that the probability of being able to alter the code correctly to match any subsequently-altered data by further unidirectional writing is small.

2. The disk drive of claim 1, wherein the code is a cryptographic hash.

3. The disk drive of claim 1, comprising a housing, the disk being sealed in the housing.

4. The disk drive of claim 1, wherein a length of at least one overwritten portion of the disk is a multiple of a write bubble length associated with the write head.

5. A magnetic disk drive, comprising:
   at least one disk with substantially all magnetic domains initially having the same baseline circumferential magnetization orientation as all other domains;
   at least one write head juxtaposed with the disk;
   a write driver configured to send current to the write head in one direction only, such that the write head, when energized, can orient magnetic domains on the disk only in the orientation that is opposite to the baseline orientation; and
   processing circuitry programmed to always attempt to read a sector before performing a write, and if the sector contains valid data as indicated by at least one transition, prohibiting the write.

6. A magnetic disk drive, comprising:
   at least one disk with substantially all magnetic domains initially having the same baseline circumferential magnetization orientation as all other domains;
   at least one write head juxtaposed with the disk; and
   a write driver configured to send current to the write head in one direction only, such that the write head, when energized, can orient magnetic domains on the disk only in the orientation that is opposite to the baseline orientation, wherein a run-length constrained modulation code is used to ensure that each region of medium to be overwritten is longer than a write bubble length associated with the write head, the run-length constrained modulation code placing no constraints on the length of medium remaining unchanged between each pair of overwritten regions, thus establishing an asymmetric modulation code constraint.

7. A magnetic disk drive, comprising:
   at least one disk with substantially all magnetic domains initially having the same baseline circumferential magnetization orientation as all other domains;
   at least one write head juxtaposed with the disk; and
   a write driver configured to send current to the write head in one direction only, such that the write head, when energized, can orient magnetic domains on the disk only in the orientation that is opposite to the baseline orientation, wherein in a symmetric code implementation, a run length constrained modulation, code is used to ensure that a shortest recorded magnet is longer than a write bubble length associated with the write head.

8. A magnetic recording system, comprising:
- at least one write head having a coil through which electric current can flow to induce magnetic flux at a gap defined by the write head; and
- a write driver electrically connected to the coil and configured to send current to the coil in only a permitted direction, the write driver at all times not being capable of sending current to the coil in a direction opposite the permitted direction, wherein the write driver writes a code representing data in a written sector such that the probability of being able to alter the code correctly to match any subsequently-altered data by further unidirectional writing is small.

9. The system of claim 8, comprising at least one disk with substantially all magnetic domains initially having the same baseline circumferential magnetization orientation as all other domains.

10. The system of claim 9, comprising a housing, the disk being sealed in the housing.

11. The system of claim 8, wherein the code is a cryptographic hash.

12. A magnetic recording system, comprising:
- at least one write head having a coil through which electric current can flow to induce magnetic flux at a gap defined by the write head; and
- a write driver electrically connected to the coil and configured to send current to the coil in only a permitted direction, the write driver at all times not being capable of sending current to the coil in a direction opposite the permitted direction, comprising processing circuitry programmed to always attempt to read a sector on a disk before performing a write to the sector, and if the sector contains valid data as indicated by at least one transition, prohibiting the write.

13. A magnetic recording system, comprising:
- at least one write head having a coil through which electric current can flow to induce magnetic flux at a gap defined by the write head; and
- a write driver electrically connected to the coil and configured to send current to the coil in only a permitted direction, the write driver at all times not being capable of sending current to the coil in a direction opposite the permitted direction, further comprising at least one disk with substantially all magnetic domains initially having the same baseline circumferential magnetization orientation as all other domains, wherein a run-length constrained modulation code is used to ensure that each region of medium to be overwritten is longer than a write bubble length associated with the write head, the run-length constrained modulation code placing no constraints on the length of medium remaining unchanged between each pair of overwritten regions, thus establishing an asymmetric modulation code constraint.

14. A magnetic recording system, comprising:
- at least one write head having a coil through which electric current can flow to induce magnetic-flux at a gap defined by the write head; and
- a write driver electrically connected to the coil and configured to send current to the coil in only a permitted direction, the write driver at all times not being capable of sending current to the coil in a direction opposite the permitted direction, further comprising at least one disk with substantially all magnetic domains initially having the same baseline circumferential magnetization orientation as all other domains, wherein in a symmetric code implementation, a run length constrained modulation code is used to ensure that a shortest recorded magnet is longer than a write bubble length associated with the write head.

15. A magnetic recording system, comprising:
- at least one write head having a coil through which electric current can flow to induce magnetic flux at a gap defined by the write head; and
- a write driver electrically connected to the coil and configured to send current to the coil in only a permitted direction, the write driver at all times not being capable of sending current to the coil in a direction opposite the permitted direction, further comprising at least one disk with substantially all magnetic domains initially having the same baseline circumferential magnetization orientation as all other domains, wherein a length of at least one overwritten portion of the disk is greater than the lengths of portions of the disk that retain the baseline orientation.

* * * * *